Feb. 2, 1926.  1,571,275
E. A. KELLEY
HOSE RACK
Filed Sept. 12, 1924
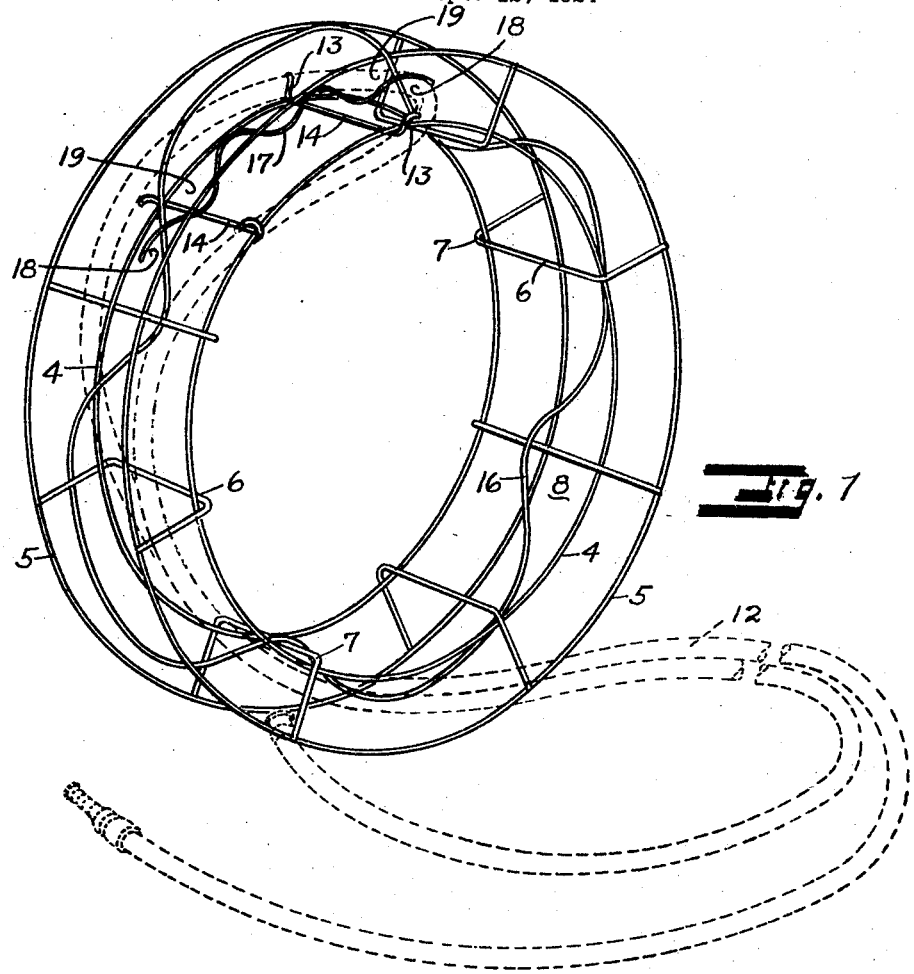
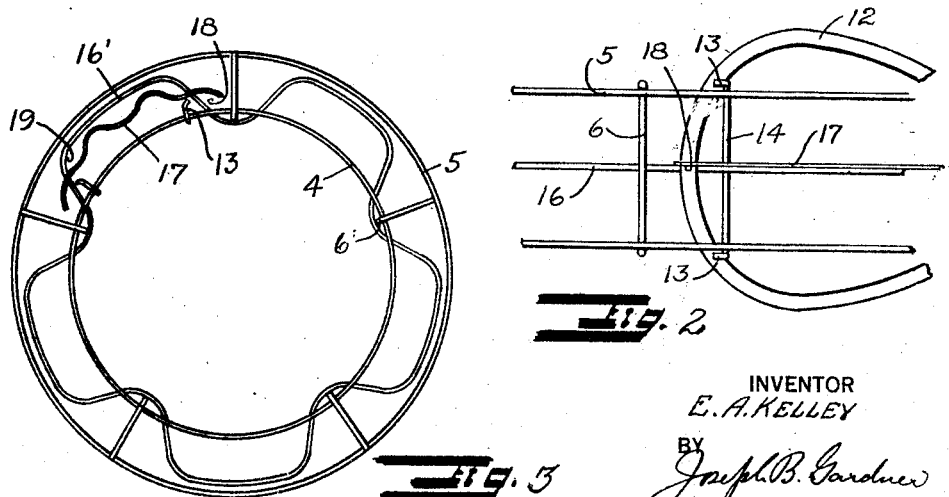
INVENTOR
E. A. KELLEY
BY
Joseph B. Gardner
ATTORNEY Patented Feb. 2, 1926.

1,571,275

UNITED STATES PATENT OFFICE.

EDGAR A. KELLEY, OF BERKELEY, CALIFORNIA.

HOSE RACK.

Application filed September 12, 1924. Serial No. 737,275.

*To all whom it may concern:*

Be it known that I, EDGAR A. KELLEY, a citizen of the United States, and a resident of Berkeley, county of Alameda, State of California, have invented a certain new and useful Hose Rack, of which the following is a specification.

My invention relates to racks which are arranged to be rolled over the ground or other surface to wind a flexible hose or the like thereon, to unwind the same, or to transport it.

An object of the invention is to provide a hose rack of simple and sturdy construction on which a hose may be wound with half the number of turns which would be required in winding the same on the usual type of rack of the same size.

Another object of the invention is to provide a device of the character described with a cylindrical hose-receiving area which is divided longitudinally to define separate hose-receiving portions by means of a partition member which materially braces the rack structure and incidentally provides a series of convenient handles extending completely around the rack.

A further object is to provide a device of the character described adapted to have the hose wound thereon in doubled form with means which will insure the proper retention of the doubled portion of the hose, and at the same time prevent undue kinking of the hose at such portion.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings;

Figure 1 is a perspective view of the rack of my invention, a hose, partly wound in the rack, being indicated by dotted lines.

Figure 2 is a fragmentary plan view of the rack including the hose retaining means.

Figure 3 is a side view of a modified form of the rack.

As illustrated in the embodiment shown in Figures 1 and 2, the device of my invention comprises axially spaced pairs of substantially concentric rings 4 and 5. The rings are preferably formed of wire of suitable strength and stiffness and are, as here shown, held in the desired relation by means of a plurality of cross arms 6. The latter are conveniently made U-shaped, and the rings are preferably positioned within and against the same. The ends of the cross arms preferably terminate at and are welded to the outer rings 5, while the inner rings are welded to the cross arms adjacent the bends 7. It will be noted that the pairs of rings and crossarms as thus related cooperate to define an annular groove 8 in which a hose 12 or the like may be wound.

The rack of my invention is particularly adapted for having the hose wound thereon while doubled, such winding affording several advantages over the usual single winding. One of such advantages is the fact that winding and unwinding of the hose may be accomplished more speedily; another advantage is the fact that both ends of the hose are at all times accessible for use. It will be understood that in such double winding of the hose, an intermediate portion is bent in a loop, which loop should be held fixed to the rack in order to permit the simultaneous winding of the two straight portions of the hose. It will be further evident that, especially during the winding process, the hose is subjected to considerable strain which particularly tends to kink it at the loop. Accordingly, means are provided for effecting such holding in a manner that kinking of the hose will be avoided. In the present embodiment of the invention, said means comprises a plurality of spaced hooks 13, preferably positioned in opposed relation at extreme opposite sides of the rack. As here shown, the hooks 13 are conveniently formed as the legs of a U-shaped cross piece 14 attached to the inner rings 4 of the rack in a manner similar to the mode of attachment of the cross arms 6. The outer extremities of each hook is spaced from the adjacent outer ring 5 to allow the passage of the hose therebetween. Two sets of hooks, opening in opposite circumferential directions, are preferably provided on the rack in order that the loop may be held to permit the winding of the hose on the rack in either direction. It will be noted that the sides of the loop of the hose are allowed to project through the space between the inner and outer rings of each pair, thus preventing a sharp bend of the hose about the hooks.

Means are provided for dividing the groove 8 into two distinct annular channels for the reception of the different ends of the hose. As here shown, said means comprises a continuous wire member 16 which is arranged to form a dividing partition in said groove, and is preferably passed over and under alternate cross arms 6. The portions of the member 16 which pass under the cross arms 6 are preferably welded to such arms while the remaining portions define a series of circumferentially aligned risers extending into the groove space to form said before mentioned partition. It will be noted that the member 16 materially aids in reinforcing the rack structure, and, furthermore, the riser portions thereof may be utilized as handles for carrying the rack.

Additional loop-holding means are associated with the member 16, which means are here shown in the form of a resilient strip 17 which is preferably welded adjacent its ends to the opposite end portions of one of said risers. The said ends of the strip extend beyond the riser to define therewith loop receiving hooks 18 which are arranged to cooperate with the hooks 13 to hold the hose loop and prevent the sharp curvature or kinking of the hose. The intermediate portion of the strip 17 is bent to form a pair of recesses 19 which cooperate with the riser to provide resilient holding means for the hose extremities.

In the embodiment of the invention illustrated in Figure 3, fewer cross arms 6' are used and the partition member 16' is arranged to be welded to all of the cross arms.

It will be seen that the rack of my invention permits the effective handling and storing of the hose. It will also be seen that by winding the hose on the rack in the manner provided for by my invention, both ends of the hose are always accessible; in this way the hose, particularly when of the non-collapsible type, may be readily connected and used without requiring the unwinding of the complete hose. In connection with the foregoing it is to be noted that the rack may be rolled about with the hose in use without danger of the hose becoming loosened since the loop is securely held in position by the member 17.

I claim:

1. In a device of the character described, axially spaced pairs of substantially concentric rings, cross arms connecting said pairs together, and forming therewith an annular hose-receiving groove, and a partition dividing said groove into separate annular-hose-receiving channels and comprising a substantially continuous member passing under and secured to said arms and extending into said groove.

2. A device in accordance with claim 3 characterized by means positioned adjacent the base and center of said groove for resiliently engaging a portion of the hose.

3. A device in accordance with claim 3 having hose loop engaging means positioned at the opposite sides of said groove and adjacent the portion of said partition member where it passes under one of said arms.

4. In a device of the character described a plurality of annular members and cross arms connecting same together to form therewith an annular hose receiving groove, and a partition member fixed to said arms to divide said area into separate hose receiving channels and forming a series of circumferentially aligned loops lying within said groove.

5. In a device of the character described a plurality of annular members and cross members connected together to form an annular hose-receiving groove having open sides, and pieces extending outwardly along opposite sides of said groove and spaced from the outer extremity of said sides.

6. A rack arranged to have a hose wound thereon while doubled, comprising axially spaced and aligned wire rings, cross-arms connecting said rings together and forming therewith an annular hose receiving channel, and a wire partition secured to said cross-arms and extending around said channel to provide separate areas for the reception of the different legs of the hose.

7. In a device of the character described, a pair of spaced rings and spaced cross members connected together to form a perimetrical hose-receiving groove, and a partition interposed between said rings and extending substantially completely around said groove to form thereof separate hose receiving spaces.

8. In a rack arranged to have a hose wound thereon while doubled, a pair of side members, cross members connected thereto and defining therewith a continuous hose-receiving space, and means adjacent the base and said sides of the space and engageable by said hose from the inside of the space arranged for engagement with the loop of the hose to prevent the kinking thereof.

In testimony whereof, I have hereunto set my hand at Oakland, California, this 6th day of September, 1924.

EDGAR A. KELLEY.